Figure 1:
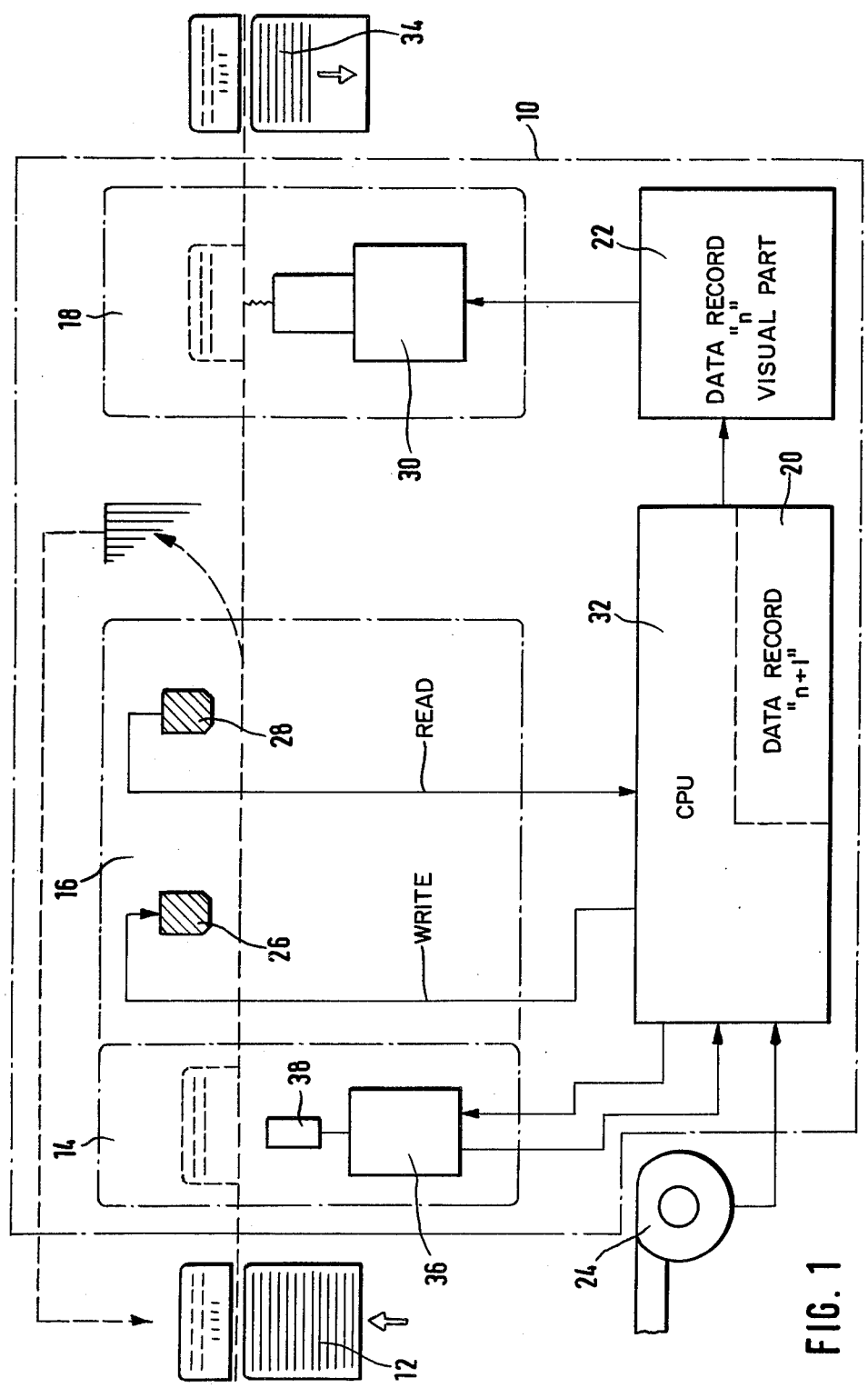

United States Patent [19]

Maurer et al.

[11] Patent Number: 4,467,209

[45] Date of Patent: Aug. 21, 1984

[54] METHOD OF PRODUCING IDENTIFICATION CARDS AND A DEVICE FOR CARRYING OUT SAME

[75] Inventors: Thomas Maurer; Erwin Lob; Peter Schweiger, all of Munich, Fed. Rep. of Germany

[73] Assignee: GAO Gesellschaft für Automation und Organisation mbH, Fed. Rep. of Germany

[21] Appl. No.: 331,188

[22] Filed: Dec. 16, 1981

[30] Foreign Application Priority Data

Dec. 31, 1980 [DE] Fed. Rep. of Germany ....... 3049607

[51] Int. Cl.$^3$ .............................................. G06K 3/02
[52] U.S. Cl. .................................. 235/487; 235/379; 283/904
[58] Field of Search ............... 235/487, 488, 492, 493, 235/494, 375, 379, 490; 283/904

[56] References Cited

U.S. PATENT DOCUMENTS

| | | | |
|---|---|---|---|
| 3,988,571 | 10/1976 | Blair et al. | 235/379 |
| 4,027,142 | 5/1977 | Paup et al. | 235/379 |
| 4,262,589 | 4/1981 | Gebhardt | 235/379 |

FOREIGN PATENT DOCUMENTS

| | | | |
|---|---|---|---|
| 16958 | 2/1979 | Japan | 235/379 |
| 76475 | 6/1980 | Japan | 235/379 |

OTHER PUBLICATIONS

"Laser Focus" Sep. 1980, pp. 28 and 29.

*Primary Examiner*—A. D. Pellinen
*Assistant Examiner*—Robert Lev
*Attorney, Agent, or Firm*—Andrus, Sceales, Starke & Sawall

[57] ABSTRACT

A method of personalizing identification cards having erasable and/or overwritable and non-overwritable data. The neutral identification cards, before being written on, are first fed from an input stack to a unit in which the overwritable storage medium, e.g. a magnetic stripe, is written on with the erasable or overwritable data. After the writing process has been checked, the card is removed from the process if its writing is defective, and possibly reinserted in the input stack. If the writing is in order, however, the card is fed to another unit in which it is provided with the non-erasable or non-overwritable data.

Data records are made available by a card-issuing agency in order to personalize the identification cards. One data record is kept on hand in a buffer memory for the writing of each identification card. The buffer memory is only loaded with a new data record after the correct writing on the magnetic stripe has been signalled, while the part of the old data record necessary for writing on the non-overwritable data is transferred to a second memory. A data record is thus only assigned permanently to an identification card when the technically delicate processing steps have been successfully carried out. In this way the reject rate can be kept low at a high throughput. The produced cards are also stacked automatically in the same order as the delivered data records.

16 Claims, 2 Drawing Figures

Dn = MOMENTARY ACTUAL DATA RECORD
Dmn = MACHINE READABLE PART OF THE DATA RECORD
Dvn = VISUAL RECOGNIZABLE PART OF THE DATA RECORD

Dn ≙ MOMENTARY ACTUAL DATA RECORD
Dmn ≙ MACHINE READABLE PART OF THE DATA RECORD
Dvn ≙ VISUAL RECOGNIZABLE PART OF THE DATA RECORD

METHOD OF PRODUCING IDENTIFICATION CARDS AND A DEVICE FOR CARRYING OUT SAME

The invention relates to a method of personalizing identification cards in which laminated, user-neutral, i.e. blank identification cards provided with at least one repeatedly recordable storage medium are provided with data, and part of the data are arranged on the identification card so as to be overwritable and another part so as not to be overwritable.

The German application No. 28 54 862 already discloses a method of producing and personalizing identification cards in which the copies joined on continuous sheets are written on in a high-speed printer to personalize the card blanks. This writing is carried out by using a data record containing all required information about the user. The next production step involves cutting the written-on continuous sheet or Leporello into single sheets, laminating them between two transparent films and providing them with magnetic stripes. The single cards are then punched out and further data of the data record assigned to the card are inscribed in the magnetic strip.

During the various production steps the production must constantly be checked for rejects. Eliminated identification cards or partially fabricated cards require subsequent production and thus a repetition of all the procedural steps that have already been performed. The method involves considerable time and a high reject rate, since in case of error all preceding procedural steps must be repeated every time with reference to the data record. During the entire processing period of a card the data record must be kept accessible, which requires correspondingly great technical effort for multiple access to the data of all identification cards.

A further disadvantage is that in practice the various processing steps are carried out in different processing areas, i.e. in the computing center of a bank, on the one hand, and by the identification card producer, on the other, which necessitates troublesome repeated transport of partially fabricated products.

The data necessary for the personalization of identification cards are generally obtained from a magnetic tape (production tape) which is produced by the institutions that issue identification cards. To facilitate the delivery of the identification cards to the card users, the issuing agencies are requested to supply the identification card arranged in an order so as to correspond to the data record on the production tape. In case a card must be eliminated in one of the procedural steps, the order of the identification cards produced in the stack of cards no longer corresponds to the order of the data records on the production tape. The card subsequently completed crops up in another place and must be sorted into its proper place in the identification card series by hand. This resorting is very labour-intensive and thus expensive.

It is also known already to personalize identification cards by impressing part of the data as a relief into the material of the identification card. These cards are also equipped with a magnetic strip which is then written on after the irreversible impression of the card. The known method also has the disadvantage that an error in writing the magnetic strip data requires the elimination of that particular card, which increases the number of rejects and confuses the order of the produced cards. In this case the repetition of all operational steps is necessary to produce new cards, for which purpose the entire data record of the particular card must be made available subsequently, thus causing considerable trouble, especially in the organization of the data.

The German application No. 29 07 004 already discloses a personalization method for identification cards in which part of the data are written by means of a laser beam recorder directly onto or into the laminated, user-neutral card. These cards also have a magnetic stripe which also contains certain data. During production, part of the data are first inscribed irreversibly into the card by the laser recorder and then the magnetic stripe is written on. In spite of the processing speed which is considerably higher than earlier methods, this method still has the disadvantage that an erroneous application of data on the magnetic strip necessitates completely new production of the identification card, which also leads to a relatively high reject rate, on the one hand, and prevents the original order of the completed cards from being maintained, on the other.

To sum up it can be said that in all known methods the irreversible data are first applied to the identification card and the reversible data are only applied at the end. This order is presumably due historically to the fact that writing on the card blanks used to be possible before lamination and the application of the magnetic stripe data was only possible after lamination. Although this order is no longer necessary in newer methods such as the application of data by means of a laser beam recorder or the impression of the identification cards, the above-mentioned sequence has been retained unchanged in all these cases. When an error occurs, i.e. a reject is produced, in any one of the operational steps of this sequence, all operational steps must be repeated to produce a new card. For this purpose the complete data record must subsequently be made available again. The effort in organizing the data could be kept at a minimum if only one identification card at a time were processed. The economically more favorable solution, that is, simultaneous processing of several cards, must, however, be paid for with great expenditures with respect to storage capacity and data organization. A fully automatic production of the cards according to the order on the magnetic strip, however, cannot be attained even with unlimited expenditures. The reject rate is also a very important disadvantage as far as card material costs are concerned in mass production, as is the case with this type of identification card.

The object of the invention consists in providing, for the personalization of identification cards with irreversible, i.e. non-overwritable, data and reversible, i.e. overwritable, data, a method which yields to mass production with a low reject rate and makes the cards available in a stack in accordance with the data records on the production tape.

For this purpose use is made of the finding that, as opposed to usual practice, the identification card is first written on with the reversible, i.e. overwritable, data of the data record assigned to that particular card. The card only arrives at the next stage and is written on with the non-overwritable, i.e. irreversible, data when the first step has been successfully completed. Experience has shown that hardly any errors occur in this second step, when a laser recorder is employed, whereas the error rate is relatively high when magnetic stripes, for example, are written on. The defective cards are eliminated from the process after being checked and are inserted again if the error was merely due to contamination. This is readily done as the card is designed so as to be user-neutral and up to then had only been written on with reversible, i.e. erasable, data.

It has been shown that the method according to the invention allows for a considerable decrease in the reject rate. As an employable identification card is produced for every data record, even in the case of "wrong storage," by the method according to the invention, the identification cards necessarily come out in the desired order, which makes time-consuming manual resorting superfluous.

In an advantageous development of the invention the complete data record assigned to a particular card is made available in an initial memory which is independent of the data bank of a central computer (e.g. magnetic tape storage). When the first procedural step, i.e. the inscription of the overwritable data into the magnetic strip of an identification card, has been successfully completed, the data record is "pushed on" into a second memory, whereby the part of the data record with the overwritable data is erased and at the same time the first memory is loaded with a new data record which is assigned to the following card. Thus the access period to the data bank of a central computer is limited to a minimum, although the data record is available for the entire duration of the relevant procedural steps. The processing speed can be considerably increased by this measure, as the magnetic strip of a new identification card can be written on while the old card is having the non-overwritable data written on, for example, by means of a laser beam recorder. In each phase, access to the appropriate data is ensured.

The advantages of the method according to the invention mainly consist in the fact that defective identification cards, e.g. ones merely having soiled magnetic stripes, which can basically be reused after being properly cleaned, can be fed into the system again and be written over with other data before they are written on with unerasable data. As most magnetic stripe writing errors are due to eliminable defects such as contamination, the reject rate can be reduced to a minimum.

Error detection in the first writing phase with machine-readable, invisible and erasable data can be carried out completely automatically, resulting in uninterrupted, serial issuing of the identification cards by the appropriate device, without any manual intervention or finishing being necessary.

As opposed to some known methods, the production rejects in the method according to the invention do not also put a burden on the units in which the cards are written on. The method according to the invention can also be carried out localized in one and the same place.

The method according to the invention can be used for all identification cards having a data carrier in which data can be written over, i.e. recorded reversibly. Such data carriers are, for example, magnetic stripes or integrated circuits that can be programmed with the relevant information.

The non-overwritable, i.e. irreversible, data can also be applied to the identification card in any way one pleases. It has, however, proved to be particularly advantageous to write on the identification cards with a laser beam recorder due to the high processing speed, the high degree of protection against forgery and falsification and attendant great flexibility.

To additionally protect the identification cards, the unit for writing the overwritable data on the cards can be preceded by a unit which reads a certain card-specific feature, a so-called "unique feature", off the card and jumbles it by an algorithm with the data record assigned to the card. This type of feature can be represented, for example, by randomly distributed magnetic areas in the card.

The unique feature can also be inscribed in the identification card as a separate code number in addition to the overwritable data. The result of the jumbling can also be interwoven with the overwritable data record. For this purpose a partial reproduction of the arithmetical result in addition to the overwritable data is also possible. When the card is used later, the arithmetical result is verified again in an evaluating device and the presence of data manipulation or the assignment of the magnetic stripe to a particular identification card is checked in this way.

In the following, an embodiment of the invention is described by way of example on the basis of the attached drawings. These show:

FIG. 1 schematic block diagram of a device for carrying out the method, and

Figure 2:
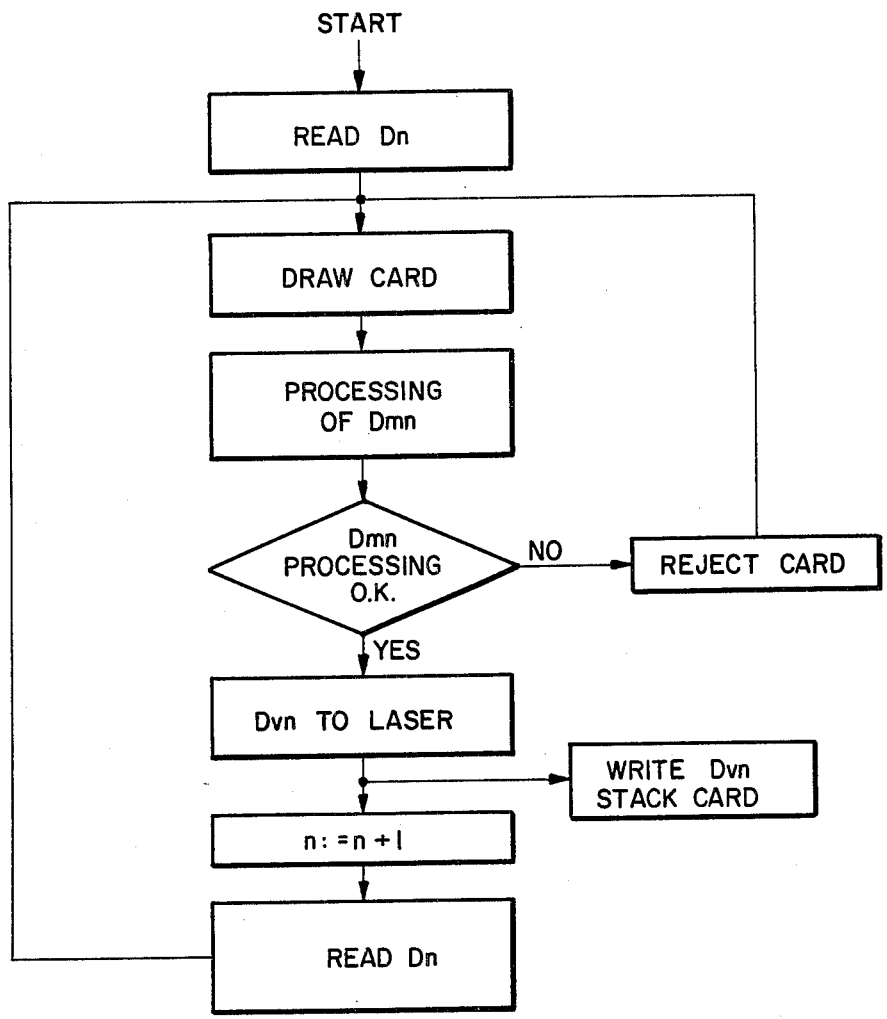

FIG. 2 a functional diagram of the device of FIG. 1.

As shown in FIG. 1, the laminated, user-neutral, i.e. blank identification cards are fed in a stack 12 to the device 10, which, however, is shown schematically in FIG. 1 with respect to its functional units. Block 14 indicates the first unit for reading and further processing a card-specific feature; block 16 indicates the first writing and reading unit, also called "test unit" in the following, in which the storage media of the cards are provided with overwritable, i.e. reversible, data and the inscribed data are checked. Block 18 indicates the second writing unit, in which the cards are written on with non-overwritable, i.e. irreverisible, data. Block 20 is the first memory, the capacity of which is such that it embraces the complete data record assigned to a particular card, and block 22 shows the second memory, which can be smaller than the memory 20 and is only loaded with the part of the data record which concerns the visual part of the data, i.e. the data which are written on the identification card non-overwritably or irreversibly. The connection with the data bank of the central computer takes place via the symbolically shown magnetic tape storage (production tape) 24.

For identification cards having a magnetic strip, two magnetic heads 26,28 are provided in the unit 16 for inscribing or reading the magnetic information. The magnetic heads and the circuit electronics necessary for signal-processing are of orthodox design and need not be described in more detail in this connection.

Unit 18 contains a known laser beam recorder with which information can be written directly onto the identification cards so as to be humanly readable, as is described in the German application No. 29 07 004. When the identification card is designed appropriately, this writing can be carried out directly onto the laminated inlay of the card through a transparent cover film. The reference number 32 refers to the central processing unit of the device 10, which contains among other things a comparator for the data of the two magnetic heads 26 and 28, and a control unit for the entire device.

The number 34 refers to the stack of personalized identification cards. The cards are present in the order of the data records of the production tape 24.

The unit 14 is not absolutely necessary, and is provided only when the magnetic stripe is to be protected additionally by taking a card-specific feature into consideration. The unit 14 has a unit 36 in which the card-specific feature read off the card by the sensor 38 is jumbled by an algorithm with the data record or part of the data record of that particular card. The unit 36 is connected with the central unit 32 for this purpose. The immediate jumbling of the card-specific data in the unit 36, instead of in the central unit 32, has the advantage that the algorithm which must necessarily be kept secret, with which the card-specific feature is linked to the data, can be withheld from the access of the operating personnel to a large extent. The unit 36 and the sensor 38 are designed in such a way that unauthorized access is practically impossible. This can be achieved, for example, by a compact construction and casting with a special casting mass.

The mode of operation of the device, or the sequence of the various procedural steps, shall now be explained on the basis of FIG. 2. First the complete data record for an identification card is read into the first memory 20 from the production tape 24. Then a user-neutral identification card is drawn into the device by an appropriately designed isolating device. This card contains a card-specific feature, if desired, but not yet any personal information whatsoever. The card has been laminated and can exhibit bank-related data, if desired.

The data record consists of the visually recognizable data which can no longer be changed after inscription into the card, for example, name, address and photo of the lawful owner, account number, bank code number, company name, identification card number, etc. The second part of the data record which can be erased any time after inscription into the card, embraces the reversible and overwritable data, for example, a certain credit institution, a currency code and all humanly readable data, in a machine-readable form as well.

After the card has been drawn into the unit 14, the card-specific information is read and jumbled in the unit 36 by a secret algorithm with the data record. The result is fed to the central unit 32.

Then the card runs by means of a transport device not shown into the unit 16, where all machine-readable data, i.e. the data that can be erased and written over any time, are recorded on the magnetic track with the magnetic head 26, taking the card-specific information into consideration. During further transport these data are read by the magnetic head 28 and their correspondence with the data record is checked in the central unit 32. If they do correspond, the card runs on into the unit 18, where the humanly readable part of the data record is written onto the card by means of the laser beam recorder 30. During further transport of the card from the unit 16 to the unit 18, the data record is pushed from the memory 20 to the memory 22, whereby only the part of the data record which is necessary for the unit 18 is retained. The machine-readable part of the current data record is erased in the process. At the same time the data record of the following card "n+1" is read into the memory 20 from the production tape 24. The device, or rather the relevant memories, are only connected with the central computer as long as they are being loaded; during the entire processing period of the cards the device memories are separate from the actual data bank, which can perform other tasks during this time.

If the checking of the cards in the unit 16 reveals that the data of a card have not been inscribed in the intended form, this faulty card is withdrawn and a newly introduced neutral card is written on again with the same data, etc. The withdrawn cards can possibly be introduced again into the stack 12 after being cleaned and be written over with the data that are present for another card. As more than half of all writing errors on the magnetic stripe are due to contamination, the rejects can be considerably reduced in this way.

The recycling of defective cards back to the beginning is shown in FIG. 1 by broken lines.

What is claimed is:

1. A method for recording data from a data source on a blank data card, the data having a first portion to be erasably recorded, and a second portion to be permanently recorded the card having at least one overwritable recording medium and a medium for permanently recording data, said method comprising the steps of:
   providing a blank data card;
   obtaining the data to be recorded from the data source;
   recording the first data portion on the overwritable recording medium of the data card;
   reading the first data portion as recorded on the overwritable recording medium and comparing same with the first data portion obtained from the data source to determine whether the first data portion has been correctly recorded;
   rejecting the data card if the first data portion has not been correctly entered; and
   recording the second data portion on the permanent recording medium of the data card if the first data portion has been correctly entered.

2. A method as in claim 1 further defined as storing the data from the data source prior to recording the first and second data portions on the data card.

3. A method as claimed in claim 2 further defined as one for recording data on a succession of cards; wherein the storing step is further defined as sequentially storing data for the succession of cards in a memory device; and wherein the storing of the data for a subsequent card occurs after the completion of the comparison step for the previous data card.

4. A method as in claim 3 wherein the storing step is further defined in that with the storing of the data of a subsequent card, the second data portion for the previous card is stored in a further memory device.

5. A method as in claim 2 further defined as generally simultaneously recording the second data portion on a previous card and recording the first data portion on a subsequent card.

6. A method as in claim 1 further defined as recording the second data portion with a laser beam recorder.

7. A method as in claim 1 wherein each of the cards has card specific data; wherein before recording the first data portion, the card specific data is obtained from the card; and wherein the card specific data is recorded on the overwritable recording medium.

8. A method as in claim 7 further including the step of incorporating the card specific data in the first data portion prior to recording same.

9. A method as in claim 7 further including the step of altering the card specific data after obtaining same.

10. A device for recording data from a data source on a succession of data cards, the data having a first portion to be erasably recorded on the card and a second portion to be permanently recorded on the card, each card having at least one overwritable recording medium and a medium for permanently recording data, said device comprising:

a transport system for conveying the succession of cards through the device;

a first recording means coupleable to said data source for receiving the data to be recorded and for recording the first data portion on the overwritable recording medium of each card;

a reading and comparison means coupleable to the data source for reading the data recorded on the overwritable recording medium and comparing it to the first data portion from the data source; and a second recording unit coupleable to the data source for receiving the data to be recorded and for recording the second data portion on the permanent recording medium of each card.

11. The device as in claim 10 further including means coupled to said reading and comparing means for rejecting cards determined to be defective as a result of the comparison.

12. The device according to claim 10 further including a first data storage means connected to said first recording means and said reading and comparing means, said first data storage means being coupleable to the data source for receiving and storing the data to be recorded on the card, said device further including second data storage means connected to said first data storage means and said second recording means for receiving and storing the second data portion.

13. A device as in claim 10 for recording data on data cards having card specific data, said device further including means upstream of said first recording means in said transport system for obtaining the card specific data from the cards, and means for applying same to said first recording means.

14. A device as in claim 13 further including means for altering the card specific data before applying same to said first recording means.

15. A device as in claim 10 for recording data on data cards having a magnetic overwritable recording medium and wherein said first recording means and said reading and comparison means are further defined as processing data in a form suitable for a magnetic recording medium.

16. A device as in claim 10 of recording data on data cards having an overwritable recording medium in the form of an integrated electronic circuit and wherein said first recording means and said reading and comparison means are further defined as means for processing data suitable for an integrated electronic circuit.

* * * * *